US010611500B2

(12) United States Patent
Bittroff et al.

(10) Patent No.: US 10,611,500 B2
(45) Date of Patent: Apr. 7, 2020

(54) AIR PASSENGER BRIDGE HAVING SAFETY DEVICE FOR PROTECTING AN AIRCRAFT DOOR

(71) Applicant: Hübner GmbH & Co. KG, Kassel (DE)

(72) Inventors: Uwe Bittroff, Vellmar (DE); Dirk Kessler, Vellmar (DE)

(73) Assignee: Hübner GmbH & Co. KG, Kassel (DE)

(*) Notice: Subject to any disclaimer, the term of this patent is extended or adjusted under 35 U.S.C. 154(b) by 0 days.

(21) Appl. No.: 16/376,699

(22) Filed: Apr. 5, 2019

(65) Prior Publication Data
US 2019/0322386 A1 Oct. 24, 2019

(30) Foreign Application Priority Data

Apr. 24, 2018 (EP) ..................................... 18168886

(51) Int. Cl.
B64F 1/305 (2006.01)
G01S 17/933 (2020.01)
G01S 13/93 (2020.01)

(52) U.S. Cl.
CPC ............ B64F 1/305 (2013.01); G01S 17/933 (2013.01); G01S 2013/9335 (2013.01)

(58) Field of Classification Search
CPC .................. B64F 1/305; G01S 17/933; G01S 2013/9335; E01D 15/00
USPC ......................................................... 14/71.5
See application file for complete search history.

(56) References Cited

U.S. PATENT DOCUMENTS

| 3,687,321 A * | 8/1972 | Goodhart .................. B64F 1/32 414/495 |
| 5,105,495 A * | 4/1992 | Larson ..................... B64F 1/305 14/71.5 |
| 5,257,431 A | 11/1993 | Larson et al. |
| 5,650,266 A * | 7/1997 | Taguchi ............... G03C 1/0051 430/567 |
| 7,564,367 B2 * | 7/2009 | Nelson ............... A61B 18/1492 340/686.6 |
| 2003/0057360 A1 | 3/2003 | Anderberg |
| 2003/0145400 A1 * | 8/2003 | Hinkle .................... B64F 1/305 14/71.5 |
| 2003/0145404 A1 * | 8/2003 | Hutton .................. B64F 1/3055 14/71.5 |
| 2005/0198750 A1 * | 9/2005 | Spencer .................. B64F 1/002 14/71.5 |

(Continued)

FOREIGN PATENT DOCUMENTS

| DE | 20115011 U1 | 12/2001 |
| DE | 102014104065 B4 | 1/2018 |
| EP | 3088305 A1 | 11/2016 |

(Continued)

Primary Examiner — Raymond W Addie
(74) Attorney, Agent, or Firm — Dinsmore & Shohl LLP

(57) ABSTRACT

An air passenger bridge with a coupling module for coupling to an aircraft, wherein the coupling module has a floor device. The floor device has a front edge, whereas said floor device with said front edge can be traveled towards a fuselage of an aircraft in a region below an aircraft door, and wherein a safety device is configured to avoid a collision of the floor device with the aircraft door. The safety device has at least one contactlessly acting proximity sensor that is integrated in the floor device.

17 Claims, 4 Drawing Sheets

(56) References Cited

U.S. PATENT DOCUMENTS

2009/0119854 A1* 5/2009 Nelson ............... A61B 18/1492
                                                                          14/71.5
2018/0371712 A1* 12/2018 Glatfelter .............. E01D 15/005

FOREIGN PATENT DOCUMENTS

| EP | 3301028 A1 | 4/2018 |
|----|------------|--------|
| WO | 2018034615 A1 | 2/2018 |

* cited by examiner

AIR PASSENGER BRIDGE HAVING SAFETY DEVICE FOR PROTECTING AN AIRCRAFT DOOR

CROSS-REFERENCE TO RELATED APPLICATION

This application claims priority of European Patent Application EP 18 168 886.2 filed Apr. 24, 2018.

FIELD OF THE INVENTION

The invention relates to an air passenger bridge having a coupling module for coupling to an aircraft, wherein the coupling module has a floor device and the floor device has a front edge, whereas said floor device with said front edge can be traveled towards a fuselage of an aircraft in a region below an aircraft door, and wherein a safety device is provided that is configured to avoid a collision of the floor device with the aircraft door.

BACKGROUND OF THE INVENTION

DE 10 2014 104 065 B4 describes a safety device for arrangement on a floor device of an air passenger bridge. The safety device is positioned in a region on the floor device above which an opened aircraft door is present when the coupling module of the air passenger bridge is guided to the aircraft and the door of the aircraft is open. The fuselage of the aircraft can drop slightly on the loading of the aircraft. If the coupling module having the floor device is directly in front of the door opening of the aircraft, the opened door can collide with the floor device if the aircraft drops in height over the contact area. It can in particular be the case that sudden downward movements of the aircraft fuselage occur that are due to the stick-slip effect in the landing gear of the aircraft.

The safety device is frequently of a mobile design and is also called a contact shoe or safety shoe. It has to be positioned in the region below the opened aircraft door by the operator of the air passenger bridge on the floor device of the coupling module.

A further safety device is known from DE 201 15 011 U1 that likewise has to be positioned at the required point below the opened aircraft door on the floor device of the coupling module of an air passenger bridge. The safety device has a plurality of switch elements that are activated on a contact of the aircraft door with a support surface at the upper side. If the associated switch elements are correspondingly triggered, a height adjustment device connected to the air passenger bridge and having a corresponding lifting element can be controlled via a control device such that the coupling module is likewise lowered on the downward movement of the aircraft body. The safety device that has become known is of a complex design with a large number of mechanical components and can only be handled with limitations for an operator of the air passenger bridge.

A simplification of the protection of the aircraft door from a collision with a floor device is desirable, in particular when the aircraft body drops suddenly due to the stick-slip effect. The safety device has to be designed for this purpose such that the vertical tracking of the air passenger bridge and thus of the coupling module takes place fast since too great a distance between the opened aircraft door and the floor device cannot be present since the floor device should be aligned at substantially the same height with respect to the passenger cabin floor of the aircraft with an opened aircraft door.

BRIEF SUMMARY OF THE INVENTION

The object of the invention is the further development of known safety devices for avoiding a collision of an opened aircraft door with the floor device of a coupling module at an air passenger bridge. In this respect, the safety device should also be able to recognize sudden downward movements of the aircraft body and the air passenger bridge should be able to be tracked vertically with a corresponding reaction. The safety device should furthermore be designed such that it is as easy as possible to operate for a user.

This object is achieved starting from an air passenger bridge in accordance with the preamble of claim 1 and starting from a coupling module in accordance with the preamble of claim 12 by the respective characterizing features. Advantageous further developments of the invention are set forth in the dependent claims.

The invention includes the technical teaching that the safety device is formed by means of at least one contactlessly acting proximity sensor that is integrated in the floor device.

The core idea of the invention is the avoidance of movable safety devices in the form of a safety shoe or contact shoe that has to be moved below the opened aircraft door by the operator of the air passenger bridge after the alignment of the coupling module in front of the door opening of the aircraft. This is achieved in accordance with the invention in that a contactlessly acting proximity sensor that is directly integrated in the floor device of the coupling module is used as the safety device. The manual positioning of a safety shoe or contact shoe thus becomes obsolete.

As a rule, coupling modules are always traveled to the door opening of the aircraft in the same manner so that the opened aircraft door is also generally positioned above the same region of the floor device. It can be taken into account here that aircraft doors have to be protected that open to the left and to the right in that one or more proximity sensors are arranged at a correspondingly plurality of positions in the floor device of the coupling module.

The integration of the proximity sensor in the floor device in the sense of the present invention here describes any form of a fixed arrangement of the safety device at the floor device. It is advantageous here if the proximity sensor is below the walkable upper side of the floor device in order, for example, not to produce any unnecessary tripping points and/or to minimize the risk of damage to the safety device. The safety device having the at least one proximity sensor can, however, also be placed on the upper side of the floor device and fastened thereto.

The substantial advantage is achieved by the contactless mode of operation of the proximity sensor for the recognition of the approach of the aircraft door that the proximity sensor can also already recognize a sudden approach of the lower side of the aircraft door from a greater distance to produce a signal for a control device of the air passenger bridge at correspondingly short notice and to lower the vertical level of the air passenger bridge at correspondingly short notice. Such an advance, early recognition of an approach of the aircraft door toward the floor device is not possible with a safety device acting in a tactile manner, for example with the movable safety shoes, since a contact of the lower side of the aircraft door with the safety shoe has to take place first. Fast, sudden dropping movements of the aircraft fuselage can consequently be recognized a lot more effectively using contactlessly acting sensors and an impact of the aircraft door on the upper side of the floor device of the air passenger bridge can be avoided.

Consequently, a tactile recognition of the aircraft door is avoided by the configuration of the safety device in the form of at least one proximity sensor and the operator of the air passenger bridge does not have to place any movable parts below the aircraft door. Proximity sensors can in particular be used with which small approach distances of an object can also already be recognized over greater distances so that a small approach distance of an aircraft door spaced apart from the floor device by, for example 0.02 m to 0.03 m can already be recognized. The air passenger bridge can thus be tracked in the vertical at an early time. A tracking of the air passenger bridge, however, does not necessarily already have to take place in the case of a minimal approach. A tracking movement can rather be made dependent on a predefined threshold being exceeded. It can e.g. be fixedly predefined. It can, however, also be fixed directly after the positioning of the air passenger bridge relative to the aircraft. An approach by more than 10% of the value determined after the positioning determined by the proximity sensor can e.g. be fixed as a threshold value.

If the proximity sensors permit a temporally resolved measurement of the approach movement, e.g. of the aircraft door, the dynamics of the dropping movement of the aircraft can additionally be detected. This can e.g. be used to track the air passenger bridge with corresponding dynamics in the vertical. I.e. when it is recognized by the proximity sensors that the aircraft door is approaching comparatively slowly, this does not necessarily produce an abrupt drop of the air passenger bridge as in the prior art. The air passenger bridge can rather be tracked correspondingly slowly in order, on the one hand, to keep the floor device at a safe distance from the aircraft door and, on the other hand, also not to cause any unnecessarily abrupt tracking movement that could irritate passengers present on the air passenger bridge. Conversely, with an abrupt approach of the aircraft door, a correspondingly fast tracking of the air passenger bridge can be ensured to safely avoid a collision of the aircraft door with the floor device. An upward readjustment of the air passenger bridge would also equally be conceivable provided that the sensor is also to take over the function of an autoleveler in addition to the function of the safety shoe.

In accordance with a possible advantageous embodiment for the integration of the proximity sensor, it can be arranged in a region directly behind a front edge in the floor device. A plurality of proximity sensors can be provided, for example, that are located in a row next to one another in the floor device. The row that is formed from a plurality of proximity sensors arranged next to one another can extend, for example, spaced apart in parallel with respect to the front edge of the floor device. It is in particular advantageous to arrange a plurality of proximity sensors next to one another in a row since the lateral position of the aircraft door with respect to the floor device is not constant and can be varied from time to time. The coupling module is in particular not always positioned in exactly the same position in front of a door opening of an aircraft and the exact position of the aircraft door is additionally dependent on the type of aircraft. If a plurality of proximity sensors are arranged next to one another in a row, it can be ensured that one proximity sensor or a plurality of proximity sensors sense the door of the aircraft with a particularly high reliability. A matrix-like arrangement of a plurality of proximity sensors can be provided to have even more leeway with respect to the position of the aircraft door relative to the floor device.

The sensor signals of the proximity sensors can additionally be checked for plausibility. If, for example, an air passenger moves an article, for example a piece of clothing, a bag, or similar into the sensor range of the proximity sensors, in particular of a proximity sensor that is positioned toward the door opening of the aircraft and that thus faces in the direction toward the walkable region of the floor device, it must be avoided that the air passenger bridge is lowered due to recognition of such a brief approach of an article by the proximity sensor. In accordance with the invention, the safety device can therefore have a processing unit with which it can be recognized whether a change of the distance of a sensed article has been equally recognized by a predefined number of proximity sensors. If this is the case, a conclusion can be drawn based on a certain plausibility that a reduction of the distance of the lower side of the aircraft door has actually occurred and it is not, not for example, some other article moved by an air passenger into the sensor range. I.e. a signal to lower the air passenger bridge is only generated in this case.

The proximity sensor is configured as a capacitive sensor, for example. Capacitive sensors are based on the fact that a change of an electrical capacitance of an environment is recognized that is caused, for example, by the movement of an article in the vicinity of the proximity sensor. The advantage of sensors that work capacitively is provided by their simple design. In addition, a movement of an article can already be recognized over a greater distance using a capacitive sensor. In the sense of the invention, ultrasound sensors can also be used and can form the at least one proximity sensor so that a proximity sensor can also be used that transmits a sonic signal and not an electronic wave. The proximity sensor can furthermore be configured as a radar sensor that transmits a radar signal. A distance or a distance change can in particular be determined very precisely using a proximity sensor configured as a radar sensor.

Alternatively or additionally, a proximity sensor for forming the safety device can be configured as an inductive sensor. Inductive sensors are based on a change of the inductance of the environment so that a corresponding sensing of a changing inductance can also be determined by a moved, in particular a vertically moved, aircraft door in the sensor detection zone of an inductive sensor.

There is furthermore the possibility that at least one proximity sensor is configured as an optical sensor. The proximity sensor can, for example, have a light source that cooperates with a light detector. Provision can particularly advantageously be made that the at least one proximity sensor has a laser beam source and a laser detector. There is here generally the possibility of configuring the proximity sensor such that it is configured to irradiate an electromagnetic wave or an ultrasonic signal or a radar signal. The frequency range of the electromagnetic wave in the sense of the invention is here not necessarily limited and can relate to any technically sensible frequency. The proximity sensor can thus, for example, work in the visual range, with the possibility also being given that the proximity sensor emits non-visible light, for example lase light in the infrared spectrum. There is furthermore the possibility that the proximity sensor is designed as radar and emits radar waves having an associated wavelength range. There is, for example, the possibility of integrating a radar antenna in the floor device of the coupling module to form the proximity sensor, with the opened aircraft door of the aircraft being able to be recognized by said radar antenna. If the proximity sensor is configured as an ultrasound sensor, it can have a similar, antenna-like design as in a parking aid of a vehicle.

The floor device can have a walkable upper side, with the at least one proximity sensor being arranged below the upper side or being integrated in the floor device in an areal flush manner with and terminating the upper side. As already stated, there is additionally the possibility of also fastening the proximity sensor at the upper side of the floor device in the sense of the integration of the safety device so that said proximity sensor projects out of the upper side of the floor device. The integration of the at least one proximity sensor can further advantageously be configured such that a top element is arranged above the proximity sensor, with said top element being configured as transparent for electromagnetic waves in particular comprising visual and/or infrared light. The top element, formed from glass or plastic, for example, can be so robust that that region of the floor device is also walkable below which the safety device is integrated in the form of the at least one proximity sensor.

Differently configured proximity sensors can also form the safety device in the sense of the invention. A capacitively working sensor can, for example, also be combined with an inductively working sensor. There is additionally the possibility of also combining an optical sensor with a capacitive sensor and/or with an inductive sensor. Provision can furthermore be made to use a radar sensor that serves as the proximity sensor and that is designed combined with a capacitive sensor, an inductive sensor and/or an optical sensor.

There is furthermore the possibility that at least one signaling means is also integrated in the floor device in conjunction with the integration of the proximity sensor, said signaling means being configured to display an operating state of the safety device.

The invention is further directed to a coupling module for arrangement at an air passenger bridge for coupling to an aircraft comprising a floor device and the floor device has a front edge, whereas said floor device and said front edge can be traveled towards a fuselage of an aircraft in a region below an aircraft door, with a safety device being provided that is configured to avoid a collision of the floor device with the aircraft door. In accordance with the invention, at least one contactlessly working proximity sensor is provided that is integrated in the floor device and that forms the safety device.

The at least one proximity sensor is further advantageously configured as a capacitively, inductively, or optically working proximity sensor and/or provision is made that the at least one proximity sensor is configured to emit an electromagnetic wave. The further features and advantages of the air passenger bridge are likewise used for the coupling module in accordance with the invention.

BRIEF DESCRIPTION OF THE DRAWINGS

Further measures improving the invention will be shown in more detail below together with the description of a preferred embodiment of the invention with reference to the Figures. There are shown.

DETAILED DESCRIPTION OF THE INVENTION

Figure 1:
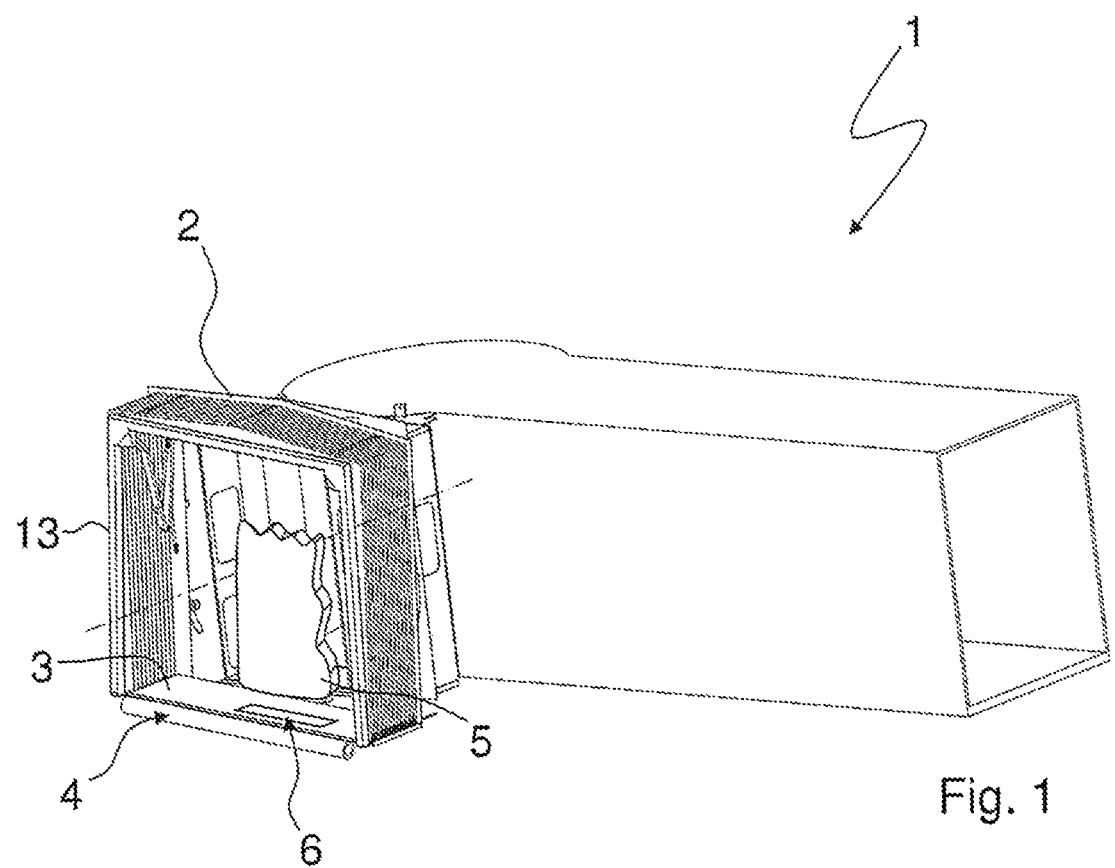
FIG. 1 is a perspective view of an air passenger bridge with a coupling module at the front side and with a floor device of the coupling module.

FIG. 1 shows a perspective view of an air passenger bridge 1 having a coupling module 2 for coupling to an aircraft. At the bottom side, the coupling module 2 has a walkable floor device 3 over which the air passengers can enter the aircraft from the air passenger bridge 1 or via which the passengers can move out of the aircraft onto the air passenger bridge 1. At the front side, a front edge 4 is present at the floor device 3 and is made up, for example, of a very yielding material to avoid damage to the body shell of the aircraft. The floor device 3 is spanned by a folding roof 13. If the coupling module 2 is placed at the door opening of an aircraft, the folding roof 13 can also be positioned at the aircraft fuselage to provide a continuous covering from the air passenger bridge 1 into the aircraft.

The invention relates to a safety device 6 that serves to sense a height of an aircraft door 5 of the aircraft above the floor device 3 to avoid a collision of the aircraft door 5 with the floor device 3 of the air passenger bridge 1. In accordance with the invention, the safety device 6 is formed as acting contactlessly and comprises proximity sensors that are embedded in the floor device 3. The safety device 6 to which the invention relates will be presented in more detail by the following Figures.

Figure 2:
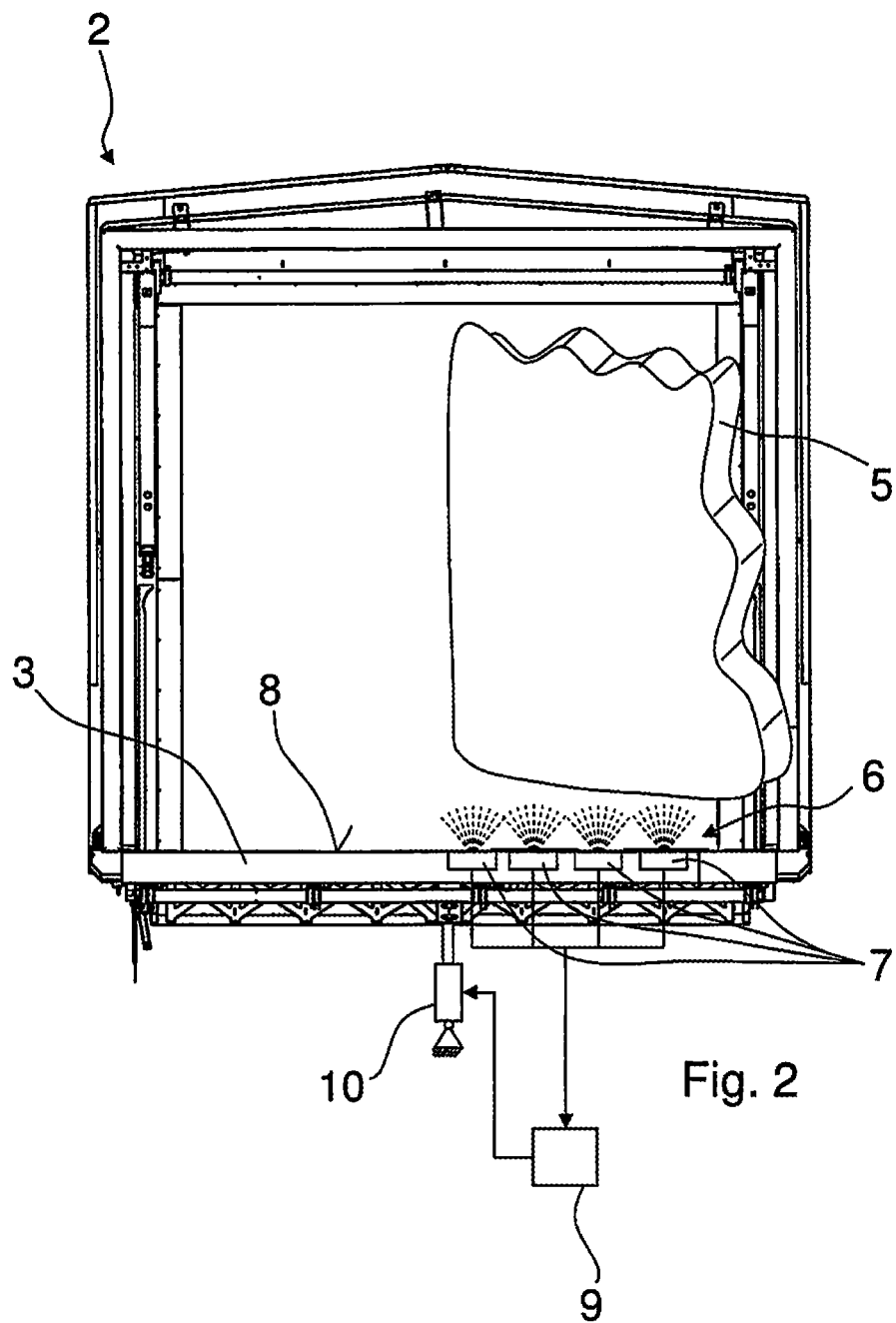
FIG. 2 is a front view of the coupling module with the floor device and with a safety device configured in accordance with the invention.

FIG. 2 shows the coupling module 2 in a front view with the walkable floor device 3 arranged at the lower side. An aircraft door 5 that is shown in part and is located at a distance above the floor device 3 due to the opening state projects into the opening region of the coupling module 2.

The aircraft door 5 has a certain distance from the walkable upper side 8 of the floor device 3 in the vertical direction. If the aircraft and thus also the aircraft door 5 is lowered, the lower side of the aircraft door 5 can collide with the upper side 8 of the floor device 3. To avoid this collision, proximity sensors 7 that form the safety device 6 to avoid a collision serve the early recognition of a reduction of the vertical distance of the floor device 3 from the aircraft door 5. The proximity sensors 7 are designed as contactlessly acting sensors. If the distance of the proximity sensors 7 fixed to the floor and thus of the floor device 3 from the aircraft door 5 is reduced, a signal can be transmitted to a control device 9 that cooperates with a lifting element 10 of a vertical adjustment device of the air passenger bridge 1. The lifting element 10 is then controlled such that on a lowering of the aircraft door 5, the air passenger bridge 1 having the coupling module 2 likewise drops to restore the required distance between the floor device 3 and the aircraft door 5.

The view in FIG. 2 shows the safety device 6 in the form of a plurality of proximity sensors 7 that are integrated by way of example in a row in the floor device 3. The proximity sensors 7 are here located below the walkable upper side 8 of the floor device 3. Within the framework of the invention, the proximity sensors 7 can, however, also be fixedly arranged in or above the upper side 8 of the floor device 3.

Figure 3:
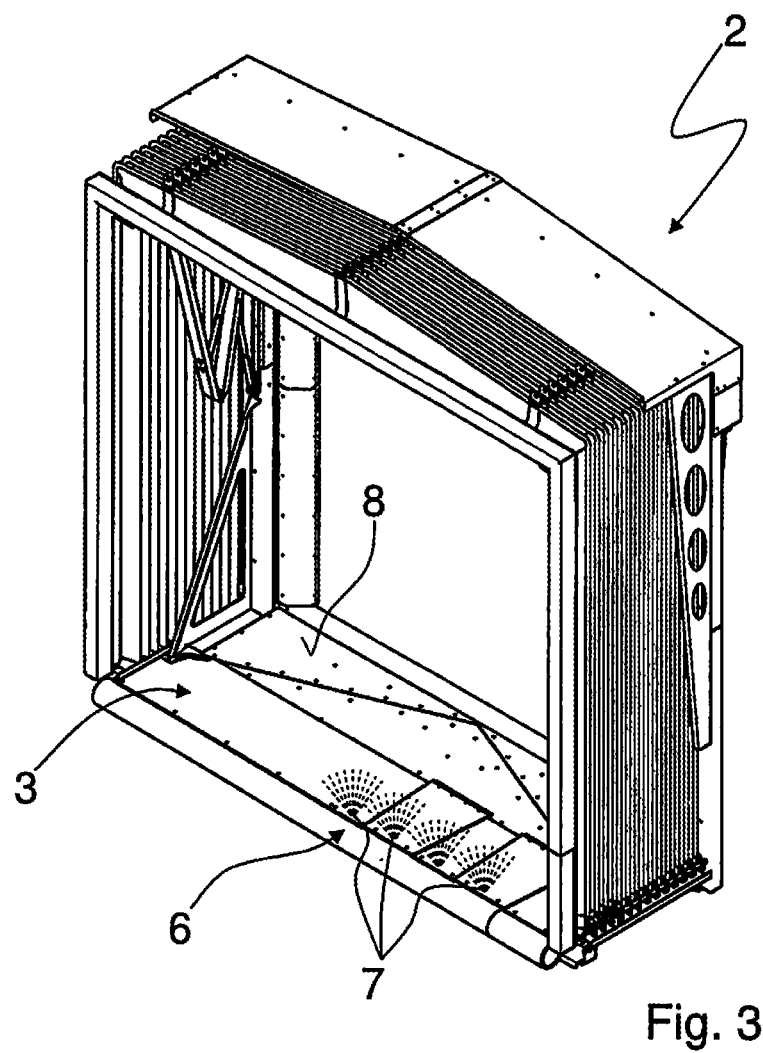
FIG. 3 is a perspective view of the coupling module with the safety device configured in accordance with the invention.

FIG. 3 shows the proximity sensors 7 in the floor device 3 of the coupling module 2 in a perspective view. The view shows the proximity sensors 7 by way of example arranged next to one another in a row. The proximity sensors 7 are here preferably only located a short distance from the front edge 4 of the floor device 3 so that an open aircraft door of an aircraft is securely arranged in a manner not shown in any more detail above the proximity sensors 7 when the coupling module 2 is placed against the aircraft.

Figure 4:
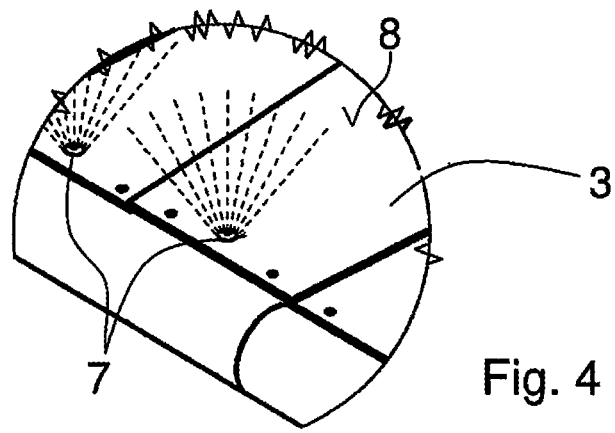
FIG. 4 is a detailed view of the exemplary arrangement of proximity sensors in the floor device.

FIG. 4 shows a detailed view of the proximity sensors 7 in an arrangement integrated in the floor device 3. The proximity sensors 7 are here located below the walkable upper side 8 of the floor device 3 adjacent to the front edge 4 by which the floor device 3 is moved against the body shell of the aircraft. The proximity sensors 7 are shown by way of example with light emission, which makes clear that the recognition zone of the proximity sensors 7 for detecting the aircraft door 5 is located above the proximity sensors 7. The proximity sensors 7 can also be configured as sensors working capacitively or inductively, with the use of acoustic or optical sensors also being possible. The proximity sensors can in particular have a laser beam source and a laser detector. It is also conceivable that the proximity sensor 7 is configured as a radar antenna. The proximity sensor 7 can generally be described such that it is configured for the emission of a sound signal or of an electromagnetic wave so that on a change of the distance of an article in the detection zone of the proximity sensor 7, this change can be recognized.

Figure 5:
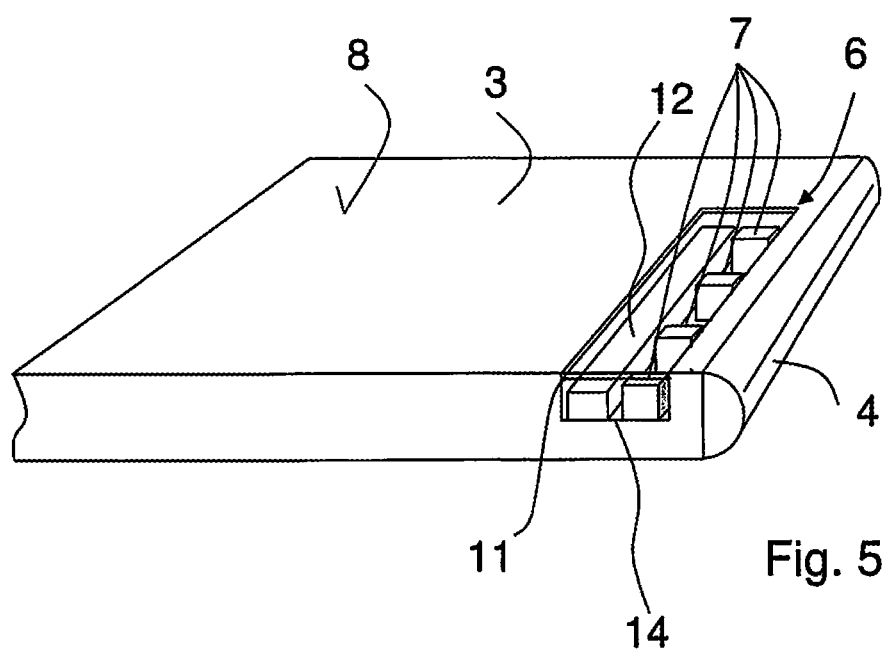
FIG. 5 is a schematic view of the floor device with integrated proximity sensors and a signaling means.

FIG. 5 shows a further developed embodiment of the arrangement of the proximity sensors 7 in the floor device 3. The floor device 3 has an installation space for the arrangement of the proximity sensors 7 below the walkable surface 8 of the floor device 3, with a signaling means 12 having the proximity sensors 7 furthermore being integrated in the floor device 3. If the safety device 6 having the proximity sensors 7 is activated, the signaling means 12 can be simultaneously activated. The signaling means 12 can, for example, emit a visible light, for example in a blue color, for an operator of the air passenger bridge. The operator of the air passenger bridge thereby receives feedback from the safety device 6 that it has been switched active and that a monitoring of the distance of the floor device 3 of the coupling module from the opened aircraft door is taking place. The view furthermore shows an embodiment in which the installation space 14 for receiving the proximity sensors 7 of the safety device 6 and for receiving the signaling means 12 is configured at the front side and adjacent to the front edge 4 of the floor device 3.

As indicated in FIG. 5, a top element 11 that terminates the installation space 14 in an areal flush manner with the surface 8 of the floor device 3 is provided to upwardly terminate the installation space 14. The top element 11 is transparent here so that the light emitted by the signaling means 12 can still be reliably recognized by an operator of the air passenger bridge. At the same time, the top element 11 is designed such that an approach of the aircraft door can still be reliably recognized by the proximity sensors 7.

The invention is not restricted in its design to the preferred embodiment provided above. A number of variants is rather conceivable that also makes use of the solution shown with generally differently designed embodiments. All the features and/or advantages, including any construction details or spatial arrangements, originating from the claims, the description or the drawings can be essential to the invention both per se and in the most varied combinations.

REFERENCE NUMERAL LIST 1 air passenger bridge
2 coupling module
3 floor device
4 front edge
5 aircraft door
6 safety device
7 proximity sensor
8 walkable upper side
9 control device
10 lifting element
11 top element
12 signaling means
13 folding roof
14 installation space

The invention claimed is:

1. An air passenger boarding bridge with a coupling module for coupling to an aircraft, comprising:
 a floor device with a front edge operable to travel towards a fuselage of an aircraft in a region below an opened aircraft door,
 a folding roof spanning the floor device; and
 a safety device comprising at least one contactlessly acting proximity sensor integrated in the floor device and configured to detect a vertical distance between the floor device and the opened aircraft door, wherein the safety device is configured to avoid a collision of the floor device with the opened aircraft door.

2. The air passenger boarding bridge of claim 1, wherein the at least one contactlessly acting proximity sensor is configured to detect an approach of the opened aircraft door with time resolution.

3. The air passenger boarding bridge of claim 1, wherein the at least one contactlessly acting proximity sensor is arranged in a region in the floor device adjacent to the front edge.

4. The air passenger boarding bridge of claim 1, wherein the at least one contactlessly acting proximity sensor comprise a plurality of proximity sensors arranged next to one another in a row or in a matrix-like manner in the floor device.

5. The air passenger boarding bridge of claim 1, wherein the at least one contactlessly acting proximity sensor comprises a plurality of contactlessly acting proximity sensors integrated in the floor device; and
 the safety device further comprises a processing unit to recognize whether a predefined number of the plurality of contactlessly acting proximity sensors sense an approach of the opened aircraft door.

6. The air passenger boarding bridge of claim 1, wherein the at least one contactlessly acting proximity sensor is a capacitive sensor.

7. The air passenger boarding bridge of claim 1, wherein the at least one contactlessly acting proximity sensor is an inductive sensor.

8. The air passenger boarding bridge of claim 1, wherein the at least one contactlessly acting proximity sensor is configured to emit an electromagnetic wave, an ultrasonic signal or a radar signal.

9. The air passenger boarding bridge of claim 1, further comprising at least one signaling device integrated in the floor device, wherein the at least one signaling device is configured to display an operating state of the safety device.

10. The air passenger boarding bridge of claim 1, wherein the at least one contactlessly acting proximity sensor is an optical sensor.

11. The air passenger boarding bridge of claim 10, wherein the at least one contactlessly acting proximity sensor comprise a laser beam source and a laser detector.

12. The air passenger boarding bridge of claim 1, wherein the floor device has a walkable upper side, and the at least one contactlessly acting proximity sensor is arranged below the upper side or is integrated in the floor device in an areal flush manner with and terminating the upper side.

13. The air passenger boarding bridge of claim 12, further comprising a top element covering the at least one contactlessly acting proximity sensor at the upper side, the top element being transparent for electromagnetic waves.

14. The air passenger boarding bridge of claim 13, wherein the electromagnetic waves comprise visual, infrared light, and/or laser radiation.

15. A coupling module for arrangement at an air passenger bridge for coupling to an aircraft, comprising:
- a floor device with a front edge operable to travel towards a fuselage of an aircraft in a region below an opened aircraft door;
- a folding roof spanning the floor device; and
- a safety device comprising at least one contactlessly acting proximity sensor integrated in the floor device and configured to detect a vertical distance between the floor device and the opened aircraft door, wherein the safety device is configured to avoid a collision of the floor device with the opened aircraft door.

16. The coupling module of claim 15, wherein the at least one contactlessly acting proximity sensor is a capacitive, inductive or an optic sensor.

17. The coupling module of claim 15, wherein the at least one contactlessly acting proximity sensor is configured to emit an electromagnetic wave.

* * * * *